(12) United States Patent
Krasikov et al.

(10) Patent No.: US 7,818,179 B2
(45) Date of Patent: Oct. 19, 2010

(54) DEVICES AND METHODS PROVIDING AUTOMATED ASSISTANCE FOR VERBAL COMMUNICATION

(75) Inventors: Sophia Krasikov, Katonah, NY (US); John F. Morar, Mahopac, NY (US); Senthilnathan Velayudham, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 10/988,013

(22) Filed: Nov. 12, 2004

(65) Prior Publication Data

US 2006/0106611 A1    May 18, 2006

(51) Int. Cl.
*G10L 11/00*   (2006.01)
*G10L 21/00*   (2006.01)
*G09B 19/04*   (2006.01)
(52) U.S. Cl. ................. 704/274; 704/270; 434/185
(58) Field of Classification Search ........... None
See application file for complete search history.

(56) References Cited

U.S. PATENT DOCUMENTS

| | | | | |
|---|---|---|---|---|
| 4,220,142 A | * | 9/1980 | Rosen et al. ........... 128/848 |
| 4,472,833 A | * | 9/1984 | Turrell et al. ........... 381/56 |
| 5,425,129 A | | 6/1995 | Garman et al. ......... 395/2.65 |
| 5,802,488 A | * | 9/1998 | Edatsune ............... 704/231 |
| 5,826,233 A | * | 10/1998 | Matsumoto ............ 704/275 |
| 6,185,527 B1 | | 2/2001 | Petkovic et al. ........ 704/231 |
| 6,544,199 B1 | * | 4/2003 | Morris ................... 600/590 |
| 7,209,955 B1 | * | 4/2007 | Major et al. ............ 709/207 |
| 2002/0091517 A1 | * | 7/2002 | Frank et al. ............ 704/231 |
| 2003/0040341 A1 | * | 2/2003 | Casais ................... 455/566 |
| 2003/0059078 A1 | * | 3/2003 | Downs et al. ........... 381/381 |
| 2003/0125955 A1 | * | 7/2003 | Arnold et al. .......... 704/270.1 |

OTHER PUBLICATIONS

Wall Street Journal article entitled "The Campaign Against 'Like' ", Feb. 3, 2004, author Andrea Petersen.

* cited by examiner

*Primary Examiner*—David R Hudspeth
*Assistant Examiner*—Samuel G Neway
(74) *Attorney, Agent, or Firm*—F. Chau & Associates, LLC (57) ABSTRACT

Devices and methods are provided for automatically analyzing a user's conversation or verbal presentation and providing feedback to the user, in real-time and/or off-line, to make the user aware of improper speech habits and thus enable the user to acquire better language habits while speaking. For example, a device for providing user awareness of speech habits may be a portable device, which can be worn or carried by the user, has various functions for monitoring and analyzing a speech session (e.g. conversation, verbal presentation) of a user and providing notification to the user of improper speech or language habits that are identified during the speech session.

35 Claims, 4 Drawing Sheets

DEVICES AND METHODS PROVIDING AUTOMATED ASSISTANCE FOR VERBAL COMMUNICATION

TECHNICAL FIELD

The present invention relates generally to devices and methods for providing automated assistance to improve verbal communication skills and, more specifically, devices and methods for automatically analyzing a user's conversation or verbal presentation and providing feedback to the user, in real-time and/or off-line, to make the user aware of improper speech habits and thus enable the user to acquire better language habits while speaking.

BACKGROUND

Speech is a tool that people commonly use for communicating with others in environments such as work, home, and school. Speech can be powerful communication tool if a person's verbal communication skills are effective and efficient. However, improper speech and language habits can render verbal communication less effective. For example, people tend to clutter their speech with "filler" terms and expressions, such as "uh", "like", and "you know". These "fillers" tend to interfere with verbal communication and can be distractive to listeners.

Moreover, other inappropriate speech habits, such as the use of profanity or other offensive words or topics, can render verbal communication less effective. In addition, during a conversation, a person may habitually utter certain sounds, such as repeatedly clearing his/her throat, clicking teeth, etc, which can be highly distracting to others. A person can improve his/her verbal communication skills by eliminating such bad speech habits.

SUMMARY OF THE INVENTION

To eliminate improper speech and language habits, a person must first be made aware of such improper habits. When a person is continually reminded of such improper habits, the person can become more aware and conscious of such habits and then try to modify or correct his/her bad speech habits. Exemplary embodiments of the invention generally include devices and methods for providing automated assistance to improve verbal communication skills. In particular, exemplary embodiments of the invention include devices and methods for automatically analyzing a user's conversation or verbal presentation and providing feedback to the user, in real-time and/or off-line, to make the user aware of improper speech habits and thus enable the user to acquire better language habits while speaking.

In one exemplary embodiment of the invention, a device to provide user awareness of speech habits includes an audio input device, a speech processing system to process continuous speech input from the user, which is input through the audio input device, a language analysis system to analyze speech processing results output from the speech processing system using pre-specified criteria to identify a speech habit; and an alert system to alert the user when a speech habit is identified by the language analysis system. Depending on the application, the device may be a non-portable device (e.g., personal computer) or a portable device that can be worn (e.g., watch) or held (e.g., mobile phone) by the user.

In one exemplary embodiment of the invention, the speech processing system can be programmed to recognize/detect certain words, expressions, sounds or unusual habits such as throat clearing or teeth clicking, for example, from a pre-programmed vocabulary list. During an active session in which the device monitors the user's speech, when the user utters one or more of the words and/or makes one or more of the sounds, for example, programmed in the vocabulary list, the language analysis system can cause alert notifications to be made instantaneously (real time) or in an off-line mode. For purposes of discreetness, real-time alert notifications can be provided in one or more of various manners including tactile alerts (minor vibration, slight pin-prick) or audio alerts (a low sound), or off-line notification can be provided by generating session summary reports for user display and review. In this way, only the user is made aware of when he/she has spoken inappropriately and the user can thus monitor him/herself without drawing undue attention from other persons conversing with the user.

These and other embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
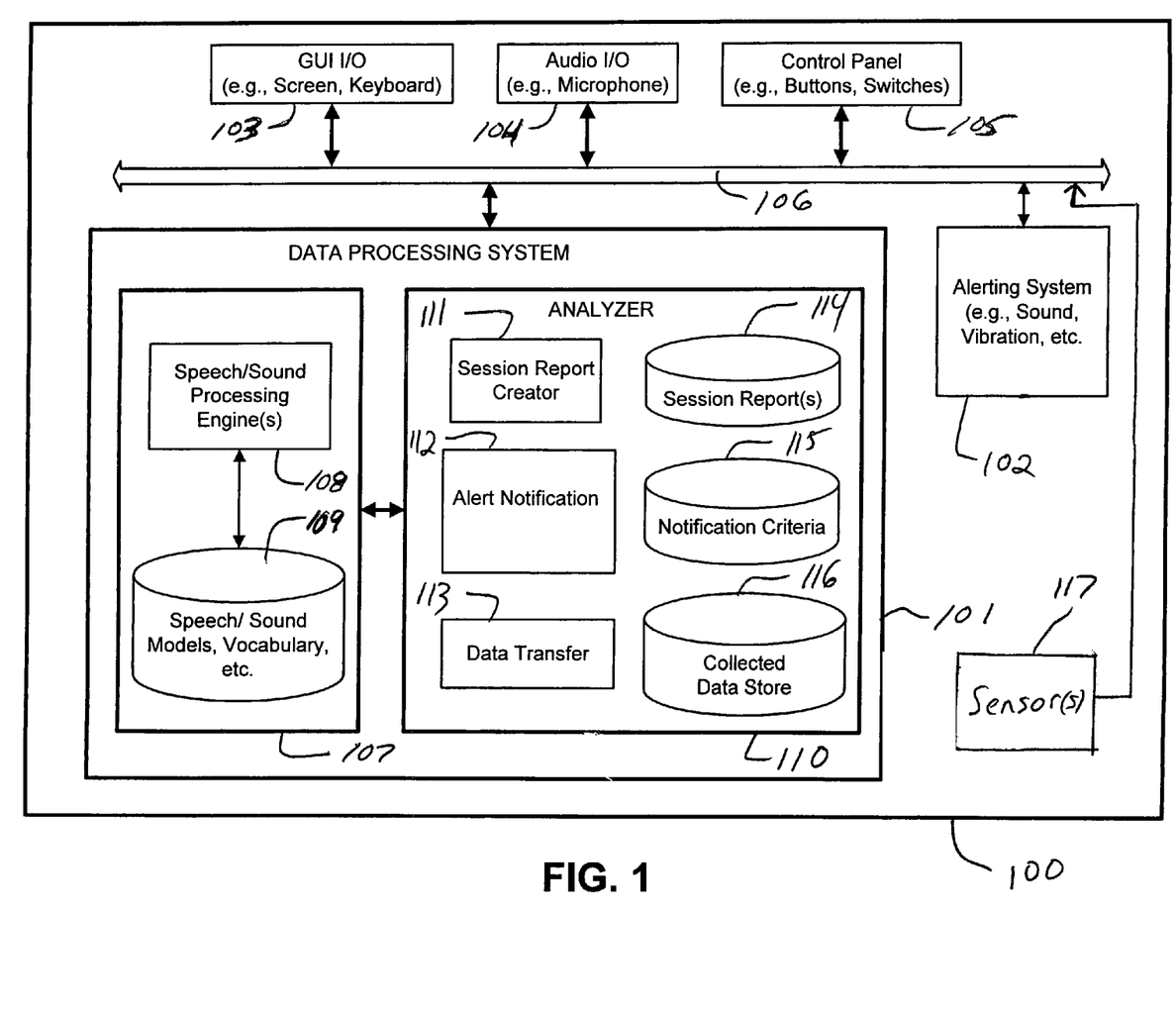
FIG. 1 is a high-level block diagram that schematically illustrates a device for providing automated verbal communication assistance according to an exemplary embodiment of the invention.

FIG. 1 is a high-level block diagram that schematically illustrates a device (100) for providing automated verbal communication assistance, according to an exemplary embodiment of the invention. More specifically, FIG. 1 depicts a verbal communication assistant device (100), which includes various functions for monitoring and analyzing a speech session (e.g. conversation, verbal presentation) of a user and providing notification to the user of improper speech or language habits of the user that are identified during the speech session, to thereby enable the user to improve his/her verbal communication or presentation skills. The device (100) generally comprises a data processing system (101), an alerting system (102), one or more user interface systems (103), (104) and (105) for enabling user interaction and control of the data processing (101) and alerting (102) systems. The various systems can communicate via a communication bus (106). The device (100) may further comprise one or more sensors (117) for acquiring environmental data (e.g., lighting, temperature, time, etc.) that can be used to evaluate a speech session. Details regarding the various functions and components of the device will be discussed below.

Exemplary embodiments of the device (100) include non-portable devices such as a personal computer, or a portable device that can be discretely worn or carried by a user. For instance, the device (100) may be physically constructed to resemble, or be integrated within, a common device such as a beeper, watch, bracelet, belt, etc, which integrates the various systems depicted in FIG. 1. In other embodiments, the device (100) may be a hand-held device such as a cell-phone or PDA (personal digital assistant), which integrates the various systems depicted in FIG. 1.

The user interface systems include a GUI (graphic user interface) system (103), an audio interface system (104) and a control panel interface (105). The GUI system (103) may comprise a display unit (e.g., small LCD screen) and keyboard for setting/selecting system parameters/functions and displaying information. The audio system (104) may comprise a microphone for capturing speech and other audio data, and may comprise a speaker for audio output. The control panel (105) may comprise buttons, switches, etc., which are used to control functions such as On/Off, volume and alert settings, etc. The type(s) of user interfaces implemented will vary depending on the processing capabilities and size of the device which embodies the exemplary functions.

The data processing system (101) comprises various modules for analyzing a user's verbal communication or verbal performance during a given session, and providing feedback to the user based on results of such analysis. For instance, during a real-time mode of operation, the data processing system (100) can generate control signals to activate the alerting system (102) to provide some form of physical feedback (e.g., tactile, auditory, visual feedback) to the user when certain conditions are met. For instance, the alerting system (102) may be a system capable of generating audio signals (low beeping sound) or tactile signals (e.g., vibration, slight pin-prick, etc.) to alert the user when the user has spoken inappropriately. In other embodiments, the device (100) can operate in an "off-line" mode, wherein the data processing system (101) can generate a session summary report including the analysis results, which can be rendered and displayed to the user via the device (100) or downloaded to a remote computing device for user review.

More specifically, the data processing system (101) comprises a speech processing system (107) having one or more engines (108) for processing speech/audio data that is captured via the microphone, and local memory (109) for persistent storage of data files and meta information used by the speech/audio engines (108) for processing captured speech/audio signals. In one exemplary embodiment of the invention, the engine(s) (108) include speech recognition methods to process speech/audio data captured during a verbal session (e.g., conversation, speech, etc.) to recognize one or more target words, expressions, and/or sounds (e.g., clicking teeth) that are specified in a vocabulary list persistently maintained in the local memory (109). The vocabulary list may contain various filler words or expressions (such as uh", "like", and "you know", etc.), profanity or other socially inappropriate words/expressions, and/or sounds, which are known to be commonly used/made by persons in general, and/or which are repeatedly used/made by the particular user. Moreover, certain keywords related to particularly sensitive topics (e.g., politics, religion, etc.) may be programmed in the vocabulary list so that the user can avoid commencing or continuing with discussions of issues related to such topics. In this regard, the speech processing engines (108) comprise speech recognition methods that are trained to recognize such target words/sounds, and the local memory (109) persistently stores trained models/patterns that are constructed for such target words/sounds in the vocabulary list.

It is to be appreciated that the speech/audio processing system (107) may be implemented using any suitable methods known to those of ordinary skill in the art. For instance, the methods described in U.S. Pat. No. 5,425,129 entitled "Method for Word Spotting in Continuous Speech", and/or U.S. Pat. No. 6,185,527, entitled, "System and Method for Automatic Audio Content Analysis for Word Spotting, Indexing, Classification and Retrieval," which are commonly assigned and fully incorporated herein by reference, can be implemented for automatically spotting words/sounds in continuous speech, and performing other audio/speech processing functions that are required for a given application of the device (100).

Indeed, it is to be appreciated that the speech processing engines (108) may implement other speech/audio processing methods to provide various functions. For instance, the speech processing system (107) may include machine self-learning methods that enable the device (100) to learn the sounds of certain fillers or repetitive words that are identified during usage of the device (100) and compile/update the vocabulary list accordingly. In other embodiments, the vocabulary list can be populated and edited by a user via a suitable user interface function.

In other exemplary embodiments, the speech processing system (107) can be programmed to identify mispronunciations of certain words. For example, the word "Close" can be pronounced as CLOZE—to shut, or CLOSE—near. If a user is prone to such pronunciation problems, the device (100) can be programmed to capture such pronunciation mistakes and alert the user appropriately.

The speech processing system (107) preferably implements methods for identifying spoken utterances of different users and/or recognizing the spoken utterances of the user/owner of the device (100), so that the device (100) is sensitive to the speech of the user and only monitors and analyzes the user's speech. Indeed, in certain instances, the source of the audio stream captured via the device microphone may be, for example, a plurality of conversational speakers including the user. In this regard, the speech/audio processing engines (108) can implement feature extraction and segmentation methods, which are known by those of ordinary skill in the art, for segmenting an audio data stream (or stream of feature vectors) into a plurality of segments where speaker changes are detected. The audio stream can be segmented according to changes in speaker without any a priori knowledge of the different speakers (unsupervised segmentation), or segmentation may be performed on the basis of the speaker using acoustic models of enrolled speakers. The segmentation enables extraction and analysis of the user's spoken utterances in a captured audio stream which may contain spoken utterances of other participants of a conversation.

The data processing system (101) further comprises an analyzer module (110) which generally operates by analyzing output results of the speech processing system (107) (and optionally other environmental data that may be captured via the sensors (117), for example, as discussed below) and generating user alerts in the form of session reports (114) or alert signals to the alerting system (102) under certain specified conditions. The analyzer module (110) comprises various modules including, for example, session report creator (111), alert notification (112) and data transfer (113) modules, as well as various data or (meta information) that is stored in one or more local memories (114), (115) and (116), as described hereafter.

The alert notification module (112) performs functions for determining when and how to alert the user based on collected data stored in the repository (116) and pre-specified notification criteria (user-specified and/or default specifications) maintained in the repository (115). For instance, in one exemplary embodiment of the invention, the alert notification module (112) will analyze the output results of the speech/audio processing system (107) during a verbal session to analyze the user's verbal communication or presentation and alert the user under certain conditions. In particular, target words, expressions, sounds that are spotted by the speech processing system (107) are collected by the analyzer module (110) and stored in the data store (116) together with other associated meta-information. The alert notification module (112) processes the stored data (116) against pre-specified conditions or notification criteria stored in the memory (115) to determine when to provide an alert notification to the user. For instance, in a real-time mode of operation, the alert notification module (112) can generate and send control signals to the alerting system (102) to alert the user when the user utters certain words or expressions or makes unusual sounds during the monitored verbal session. For instance, in one exemplary embodiment, the user can be alerted each time the user utters a target word or expression (such as an improper or profane word/expression) or when a target word or expression (e.g., "uh") is uttered a certain number of times in a short period of time, etc.

Moreover, the type of alert notification specified by the alert notification module (112) can be based on pre-specified notification criteria (115) (e.g., user-specified and/or default notification criteria). For instance, the alerting system (102) may include multiple alert modes which can be triggered under certain conditions. By way of specific example, the alerting system (102) may include a vibration mode and slight pin-prick mode, wherein the vibration mode is activated to alert the user under normal conditions (a target word is spotted) and wherein the more intrusive pin-prick mode is activated under special conditions, such as when the user curses or when the user continues to utter a target word during a verbal session, despite previous notifications. Moreover, the alert notification (112) can be programmed to generate control signals to activate the alerting system (102) with varying levels of stimulation (e.g., increasing sound alert) for repeated occurrences of improper speech habits during a user session.

In other embodiments of the invention, during a real-time or "off-line" mode of operation, the processing results of the alert notification module (112) and other relevant information can be used by the session report creator module (111) to generate a summary report of the user's verbal performances together with other useful information that enables the user to evaluate his/her verbal communication skills. Such session reports are persistently stored in the repository (114). The stored session reports (114) may include session reports that summarize the results for each monitored verbal session, as well as session reports that analyze performance results for multiple sessions to provide a summary of the user's verbal performance and improvement over a period of time. If the device (100) is equipped with a display screen, the GUI system (103) can be used to render and display a session report for user review.

The data transfer module (113) can be implemented using any suitable interface method for interfacing with remote applications/devices to download data for remote processing. For example, the data transfer module (113) can transfer one or more of the stored session reports (114) to a personal computer such that the transferred session report(s) can be rendered and displayed by a counterpart application running on the remote computer. Depending on the application and capabilities of the device (100), such data can be transferred via wired or wireless communication. For instance, the device (100) can implement wireless networking capabilities (e.g., Bluetooth) for wireless communication with remote applications/devices.

In addition, the device (100) may be programmed to provide an overnight offline analysis capability. This feature will help the user to analyze his speech performance by using data captured during the usage of this device. Performance characteristics may include rate of improvement over time, correlation between speech habits and environmental parameters such as time, temperature, level of lighting, location, presence of people, or a particular set of people, native versus non-native language etc. The device (100) can implement the one or more sensors (117) to capture environmental parameters such as time and temperature values automatically. In addition, the user can program other environmental parameters such as types of listeners (e.g., business, educational lecture, etc.) or participants of a conversation. The environmental parameters can be used as other criteria or factors that are considered for identifying speech habits and/or otherwise evaluating the user's communication skills.

In other embodiments, the device (100) may implement a playback feature that allows a user to play certain number of words before and after a detected filler word/expression or sound. For instance, the device (100) can be programmed to record/buffer a certain number of spoken words before and after detected filler words, and such words can be transcribed (via speech recognition) and included in a session report, or played back via audio output. In this manner, the user can determine the context in which such words were used, which can help the user modify his/her habit.

It is to be understood that the various functions and components implemented in device (100) will vary depending on various factors such as the device usage (e.g., worn or held) and the processing architecture and capabilities of the device (100). It is to be further understood that the various systems and methods of the device (100) can be implemented in various forms of hardware, software, firmware, special purpose processors, or a combination thereof. For example, the speech processing and data analysis functions can be implemented as an application program or embedded code, which is stored on one or more storage devices (ROM, RAM, DVD, hard disk, floppy disk, Flash memory, etc.) and executed by general or special purpose processors (microprocessors, central processing units, etc.).

Figure 2:
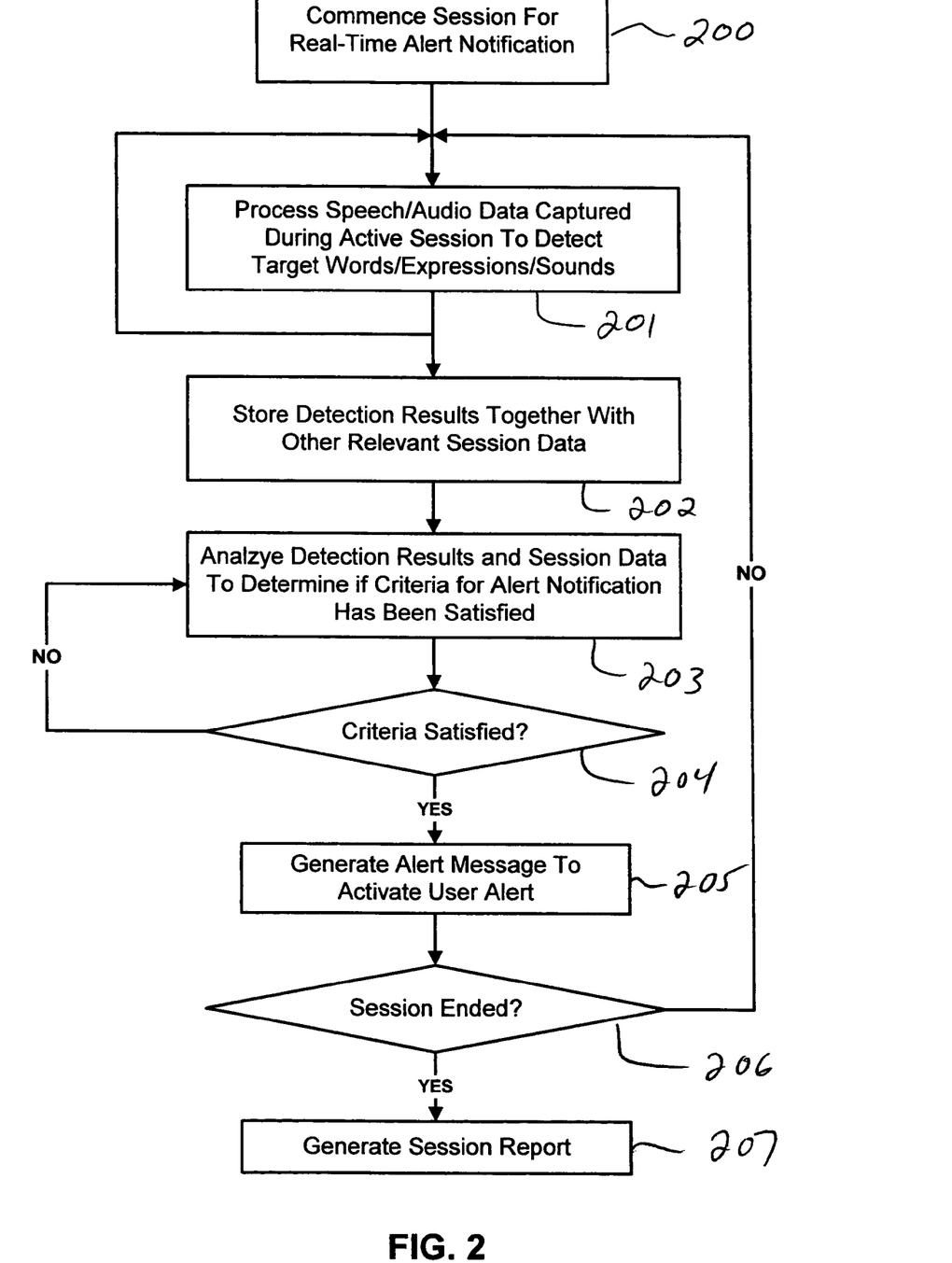
FIG. 2 is a flow diagram illustrating a method for providing automated verbal communication assistance according to an exemplary embodiment of the invention.

FIG. 2 is a flow diagram that illustrates a method for providing automated verbal communication assistance according to an exemplary embodiment of the invention. For purposes of illustration, the flow diagram of FIG. 2 will be discussed with reference to the exemplary verbal communication assistant device (100) of FIG. 1, wherein FIG. 2 can be viewed as a mode of operation of the device (100) in which a user is provided real-time notification alerts. Referring now to FIG. 2, when a user wants to have his/her conversation or verbal presentation monitored and analyzed and obtain real-time feedback, the user can activate his/her device (100) to commence a session (step 200). For instance, in the exemplary embodiment of FIG. 1, the user can press one or more buttons/switches, etc., of the control panel (105) to, e.g., turn on the device, select an alert type (e.g., vibration, sound, etc.) for real-time alert notification and activate other optional functions. In other exemplary embodiments, the device can be programmed to operate under default settings that are automatically established when the device is activated.

During an active session, as the user proceeds with a conversation or verbal presentation, for instance, the device (100) will capture a continuous audio stream containing spoken utterances of the user via the microphone. The captured audio stream is analyzed in real-time using the embedded speech processing system (107) to detect target words/expressions/sounds that are spoken/made by the user, if any (step 201). During the active session, the detection results are output to the analyzer module (110) and such results are stored together with any other relevant session data, if any, that may be collected during the active session (step 202). For example, other relevant session data may include, for example, environmental data such as time, temperature, lighting, location, presence of people, usage of native versus non-native language, etc. As noted above, such session data can be used to evaluate the person's verbal performance and/or provide means for correlating the person's verbal performance under certain conditions and/or within particular environments, etc.

The detection results and relevant session data will be analyzed via the analyzer module (110) to determine if pre-specified criteria for alert notification has been satisfied (step 203). If such criteria has not been satisfied (negative result in step 204), the analyzer module (110) will continue analyzing further detection results received from the speech processing system (107) and other possible session data collected (step 203). On the other hand, when it is determined that alert notification criteria has been satisfied (affirmative determination in step 204), the analyzer module (110) will generate an appropriate alert message (e.g., according to user-specified alert type) which activates the alerting system (102) to alert the user (step 205).

Figure 4:
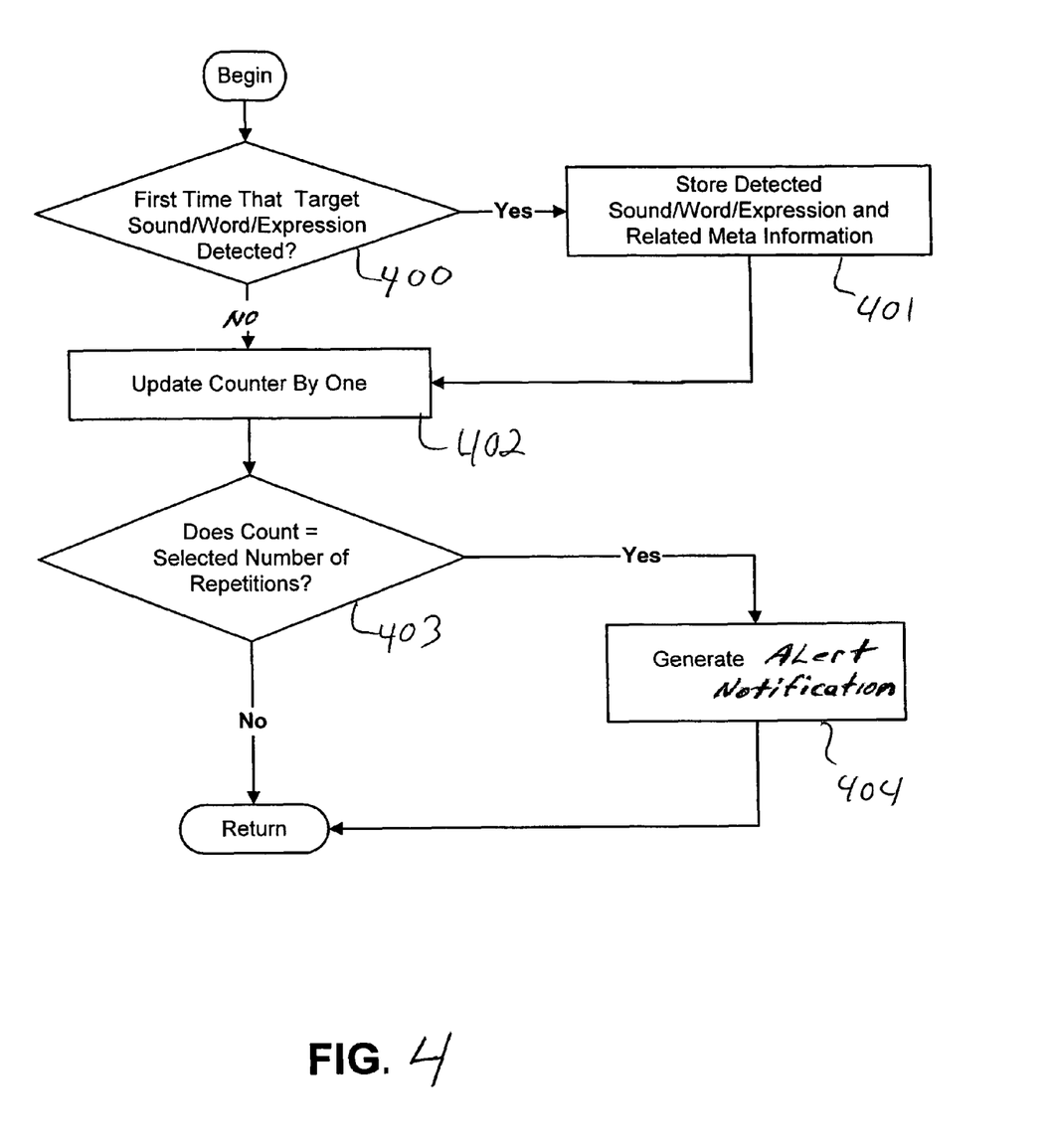
FIG. 4 is a flow diagram illustrating a method for generating alert notifications based on notification criteria, according to an exemplary embodiment of the invention.

By way of example, FIG. 4 is a flow diagram illustrating a method for generating alert notifications based on notification criteria, according to an exemplary embodiment of the invention. In general, FIG. 4 depicts alert notification criteria in which an alert notification is generated when a given target word/expression/sound has been detected repeatedly during a given session. More specifically, during a given session, when the speech processing system detects a target word, expression or sound, the detected word/expression/sound will be passed to the analyzer module (110). As depicted in FIG. 4, the analyzer module (110) will determine whether the given word/expression/sound has been detected for the first time during the session (step 400). At the first occurrence of the word/expression/sound (affirmative determination in step 400), the detected word/expression/sound is stored in the local repository (116) (step 401) and a corresponding counter will be increased by one (step 402). If the counter for the given target word/expression/sound reaches a repetition threshold (affirmative result in step 403), an alert notification will be generated (404) and the corresponding counter is initialized to zero. Otherwise, the analyzer (110) will remain in a wait state for the next detection result (e.g., next detected word/expression/sound) provided from the speech processing system (107).

The exemplary method of FIG. 4 is merely one exemplary method wherein counts are maintained for each detected word/expression/sound and an alert is provided when the count reaches a threshold. However, other embodiments can be readily envisioned by one of ordinary skill in the art. For instance, the method of FIG. 4 can be coupled with a time component, wherein the target word, etc., must be detected a certain number of times within a specified time period before an alert is provided.

Referring back to FIG. 2, while the monitoring session continues (negative result in step 206), the device will continue to capture and analyze the user's speech and generate further alerts as necessary (repeating steps 201~205). When the session has been terminated (affirmative result in step 206), the data that was collected (and the processing results that were generated) during the session will be persistently stored for further processing or user-review. For instance, the collected data and processing results for given session can be subsequently processed and compiled to generate a session report (step 207). The session report for a given session can be generated automatically or in response to a user request. Moreover, the session report can be generated by the device or the collected data and processing results for a given session can be downloaded from the device to remote computing system which generates the session report. The session report can be displayed for user review via the device (100) or the remote system.

Figure 3:
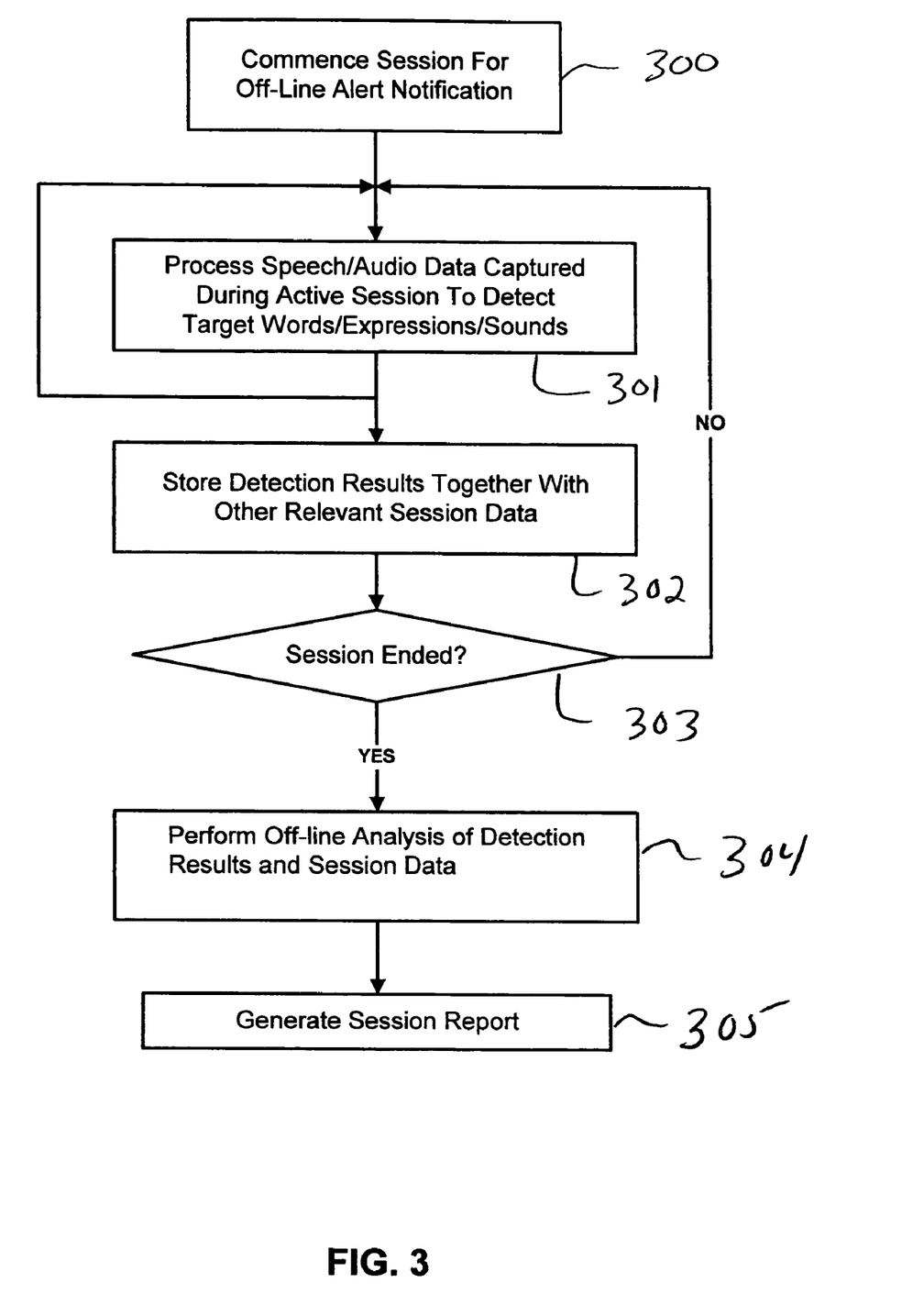
FIG. 3 is a flow diagram illustrating a method for providing automated verbal communication assistance according to another exemplary embodiment of the invention.

FIG. 3 is a flow diagram that illustrates a method for providing automated verbal communication assistance according to another exemplary embodiment of the invention. For purposes of illustration, the flow diagram of FIG. 3 will be discussed with reference to the exemplary verbal communication assistant device (100) of FIG. 1, wherein FIG. 3 can be viewed as a mode of operation of the device (100) in which "off-line" analysis is performed to provide notification alerts to the user. Referring now to FIG. 3, when a user wants to have his/her conversation or verbal presentation monitored and analyzed without immediate, real-time feedback (e.g., alert signals as in FIG. 2), the user can activate his/her device (100) to commence an "off-line" alert notification session (step 300). For instance, in the exemplary embodiment of FIG. 1, the user can press one or more buttons/switches, etc., of the control panel (105) to, e.g., turn on the device, select an "off-line" alert notification mode and activate other optional functions. In other exemplary embodiments, the device can be programmed to operate under default settings that are automatically established when the device is activated.

During an active session, as the user proceeds with a conversation or verbal presentation, for instance, the device (100) will capture a continuous audio stream containing spoken utterances of the user via the microphone. The captured audio stream is analyzed in real-time using the embedded speech processing system (107) to detect target words/expressions/sounds that are spoken/made by the user, if any (step 301). During the active session, the detection results are output to the analyzer module (110) and such results are stored together with any other relevant session data, if any, that may be collected during the active session (step 302). While the monitoring session continues (negative result in step 303), the device (100) will continue to capture and analyze the user's speech and store additional detection results and relevant session data (repeating steps 301~302).

When the session has been terminated (affirmative result in step 303), the detection results and session data collected will be stored in association with the given session. Thereafter, the detection results and session data for the given session can be subsequently processed and compiled (step 304) (off-line analysis) and the processing results can be used to generate a session report (step 305). In one exemplary embodiment of the invention, the off-line processing (step 304) can be implemented using the method of FIG. 4, for example. In such instance, the alert notification (step 404) is some type of meta-information (rather than a control signal to the alerting system (102), for example) that indicates that certain criteria have been met for a given alert condition. As with the mode of operation discussed with FIG. 2, the session report for a given session can be generated automatically after termination of the session or in response to a user request. Moreover, the session report can be generated by the device (100) or the collected data and processing results for a given session can be downloaded from the device to remote computing system which generates the session report. The session report can be displayed for user review via the device (100) or the remote system.

It is to be appreciated that verbal communication assistant devices according to exemplary embodiments of the invention can be implemented for various applications. For instance, devices and methods of the invention can be used to help stage actors to improve pitch, rate, volume, and quality of their voices. In particular, the device can be programmed to prompt an actor to pause after a particular word, or being speaking louder after a particular word, and/or change a position on a stage etc. For instance, with a portable vocabulary assistance device comprising a small screen (e.g., a wearable watch with a small LCD), the actor can be prompted with a next word or a phrase.

Moreover, users of a vocabulary assistant device according to an exemplary embodiment of the invention may include medical equipment suppliers, companies that provide coaching in speech/seminars coaching and vendors who create learning tools, individuals etc.

Moreover, in other exemplary embodiment of the invention, the device may be programmed with a range of speaking volume, beyond which the receptive device becomes alert and provides notification to a user. This may be used in applications such as anger management or where the users tend to talk too loud, frequently raise their voice and use the language inappropriately without being aware of such habits. Moreover, verbal communication assistant devices can be used by teachers and lecturers, people engaging in debate over sensitive topics, and travelers adjusting to new rules of communications. Overall, verbal communication assistant devices according to the invention can help people to break bad speech habits and acquire better language habits, which make for better human communications.

Although illustrative embodiments have been described herein with reference to the accompanying drawings, it is to be understood that the invention is not limited to the precise system and method embodiments described herein, and that various other changes and modifications may be affected therein by one skilled in the art without departing form the scope or spirit of the invention. All such changes and modifications are intended to be included within the scope of the invention as defined by the appended claims.

What is claimed is:

1. A non-transitory storage device embodying instructions executable by a processor to perform an automated method for providing awareness of speech habits of a speaker using the program storage device, comprising:
   receiving speech input from the speaker during a speaking session;
   receiving speech input from a different speaker during the speaking session;
   segmenting in real time the speech input from the speaker from the speech input from the different speaker;
   processing segmented speech input from the speaker to determine that a speech habit of the speaker occurs; and
   generating an alert to the speaker in real time while the speaker is speaking during the speaking session from which the speech input of the speaker and the speech input from the different speaker is segmented,
   wherein the speech input from the speaker is analyzed to detect one or more words or expressions or sounds, if any, which are specified in a vocabulary list, in the speech input of the user,
   wherein an identified speech habit comprises exceeding a range of volume of speaking a word or expression specified in the vocabulary list, and
   wherein a counter is incremented corresponding to a number of instances of exceeding a range of volume in the speech input from the speaker and the counter is compared to a repetition threshold for determining a speech habit in the speech input from the speaker based upon a predetermined value of the counter within a predetermined time period.

2. The non-transitory storage device of claim 1, further comprising:
   processing the speech input from the speaker to determine an instance of a predetermined filler in the speech input, wherein the predetermined filler is specified in a vocabulary list;
   incrementing a counter corresponding to a number of instances of the predetermined filler in the speech input from the speaker;
   comparing the counter to a repetition threshold for determining a speech habit in the speech input from the speaker, wherein the speech habit is determined upon a predetermined value of the counter within a predetermined time period; and
   collecting data associated with alerts generated during the speaking session; and
   generating a session report based on the data after a termination of the speaking session.

3. The non-transitory storage device of claim 1, wherein:
   speech processing results obtained during the speaking session are storable, and
   analysis of the speech processing results is performable after the speaking session has ended,
   wherein a predetermined number of spoken words before and after a detected word/expression or sound in the storable speech processing results is recorded to provide a context for the detected word/expression or sound.

4. A device to provide awareness of speech habits of a speaker using the device, comprising:
   an audio input device;
   a speech processing system that processes speech input from the speaker through the audio input device, segments in real time speech input from a different speaker through the audio input device, and provides speech processing results;
   a language analysis system that analyzes the speech processing results output from the speech processing system using pre-specified criteria for identifying a speech habit of the speaker;
   an alert system that alerts the speaker in real time while the speaker is speaking during the speaking session from which the speech input of the speaker and the speech input of the different speaker is segmented; and
   a user interface for controlling the device,
   wherein the speech processing system comprises a word spotting system adapted to analyze the speech input of a user for detecting one or more words or expressions or sounds, if an which are specified in a vocabulary list, in the speech input of the user, and
   wherein an identified speech habit comprises exceeding a range of volume of speaking a word or expression specified in the vocabulary list, and
   wherein a counter is incremented corresponding to a number of instances of exceeding a range of volume in the speech input from the speaker and the counter is compared to a repetition threshold for determining a speech habit in the speech input from the speaker based upon a predetermined value of the counter within a predetermined time period.

5. The device of claim 4, wherein the device is wearable by a user.

6. The device of claim 4, wherein the speech processing system comprises a word spotting system adapted to analyze the speech input of a user for detecting one or more words or expressions or sounds, if any, which are specified in a vocabulary list, in the speech input of the user.

7. The device of claim 6, wherein an identified speech habit comprises an incorrect pronunciation of a word.

8. The device of claim 6, wherein an identified speech habit comprises a repetitive use of a word or expression specified in the vocabulary list.

9. The device of claim 6, wherein an identified speech habit comprises a sound specified in the vocabulary list being made by the user.

10. The device of claim 6, wherein the speech processing system comprises a learning methodology system that automatically compiles the vocabulary list from speech data collected during usage of the device.

11. The device of claim 6, wherein the vocabulary list is editable by the user through the user interface.

12. The device of claim 4, wherein a tactile alert signal is provided by the alert system.

13. The device of claim 12, wherein the tactile alert signal comprises a vibration.

14. The device of claim 12, wherein the tactile alert signal comprises a pin prick.

15. The device of claim 4, wherein the alert system provides an audio alert signal.

16. The device of claim 4, wherein the user interface is adapted to allow the user to specify an alert type provided by the alert system.

17. The device of claim 4, wherein:
the device is operable in an "off-line" mode,
the speech processing results obtained during a user speaking session are storable, and
analysis of the speech processing results is performable after the user speaking session has ended.

18. The device of claim 4, further comprising at least one sensor that collects environmental data during a user speaking session, wherein the language analysis system is adapted to use the collected environmental data for identifying a speech habit or for evaluating an identified speech habit.

19. The device of claim 18, wherein the at least one sensor includes a temperature sensor, a lighting sensor, or a time sensor.

20. The device of claim 4, wherein:
the speech processing results obtained during the speaking session are storable, and
analysis of the speech processing results is performable after the speaking session has ended,
wherein a predetermined number of spoken words before and after a detected word/expression or sound in the storable speech processing results is recorded to provide a context for the detected word/expression or sound.

21. An automated method for providing awareness of speech habits of a speaker comprising:
providing a speech processing system wearable or handheld by the speaker;
processing by the speech processing system speech input from the speaker during a speaking session;
processing by the speech processing system speech input from a different speaker during the speaking session;
segmenting in real time by the speech processing system the speech input from the speaker from the speech input from the different speaker;
analyzing by the speech processing system speech processing results of the speaker using pre-specified criteria to identify a speech habit of the speaker; and
alerting the speaker in real time while the speaker is speaking during the speaking session from which the speech input of the speaker and the speech input of the different speaker is segmented,
wherein the speech input of the speaker is analyzed to detect one or more words or expressions or sounds, if any, which are specified in a vocabulary list, in the speech input of the user,
wherein an identified speech habit comprises exceeding a range of volume of speaking a word or expression specified in the vocabulary list, and
wherein a counter is incremented corresponding to a number of instances of exceeding a range of volume in the speech input from the speaker and the counter is compared to a repetition threshold for determining a speech habit in the speech input from the speaker based upon a predetermined value of the counter within a predetermined time period.

22. The method of claim 21, wherein processing speech input from the speaker comprises analyzing the speech input of the speaker for detecting one or more words or expressions or sounds, if any, in the speech input, which are specified in a vocabulary list.

23. The method of claim 22, wherein an identified speech habit comprises an incorrect pronunciation of a word.

24. The method of claim 22, wherein an identified speech habit comprises a repetitive use of a word or expression specified in the vocabulary list.

25. The method of claim 22, wherein an identified speech habit comprises sounds specified in the vocabulary list being made by the speaker.

26. The method of claim 22, further comprising automatically compiling the vocabulary list from speech data collected from the speaker.

27. The method of claim 21, wherein alerting the speaker comprises providing a tactile alert signal.

28. The method of claim 27, wherein the tactile alert signal comprises a vibration.

29. The method of claim 27, wherein the tactile alert signal comprises a pin prick.

30. The method of claim 21, wherein alerting the speaker comprises providing an audio alert signal.

31. The method of claim 21, further comprising manually specifying an alert signal by the speaker.

32. The method of claim 21, further comprising storing speech processing results obtained during a user speaking session, and wherein analyzing the speech processing results is performed after the speaking session has ended.

33. The method of claim 21, further comprising collecting environmental data during the speaking session, wherein analyzing further comprises using collected environmental data for identifying a speech habit or for evaluating an identified speech habit.

34. The method of claim 33, wherein the collected environmental data comprises one of temperature, lighting, time, or a combination thereof.

35. The automated method of claim 21, wherein:
speech processing results obtained during the speaking session are storable, and
analysis of the speech processing results is performable after the speaking session has ended,
wherein a predetermined number of spoken words before and after a detected word/expression or sound in the storable speech processing results is recorded to provide a context for the detected word/expression or sound.

* * * * *